United States Patent Office 3,433,474
Patented Mar. 18, 1969

3,433,474
**HYDROPNEUMATIC SUSPENSIONS
FOR MOTOR VEHICLES**
Jean Piret, Bougival, France, assignor to Societe Anonyme
  Societe des Automobiles Simca, Paris, France
Filed Aug. 9, 1966, Ser. No. 571,247
U.S. Cl. 267—65
Int. Cl. B60g *11/30;* F16f *9/14*
4 Claims

ABSTRACT OF THE DISCLOSURE

A hydropneumatic suspension for a motor vehicle comprising a pump having its output selectively communicated to hydropneumatic suspension members or returned to a supply tank by two trim-correcting slide valve distributors controlled by wheel suspension members. The slide valve distributors being cooperatively associated with two series connector closure members which selectively control the passage of fluid in a bypass conduit connected to the pump and supply tank in dependance upon the position of the slide valves.

---

The present invention relates to hydropneumatic suspensions, particularly for motor vehicles, and has for an object improvements therein.

In known hydropneumatic suspensions, comprising a mechanically controlled pump for supplying the jacks and hydropneumatic accumulators, a slide-valve distributor is used for correcting the trim or stable positioning and is hereinafter referred to simply as "trim" said distributor controlling the supply to the jacks and accumulators, in order to maintain constant the height of the vehicles from the ground, whatever may be their load.

As the trim correcting device operates only intermittently and for a relatively short period of time compared with the total use of the vehicle, it is advantageous to maintain the pressure only during the operation of the trim-correcting device. Thus, the duration of use of the hydraulic components is prolonged and the main power absorbed by the drive motor of the pump is diminished.

For this reason, it has already been proposed to use an accumulator to cooperate with a valve device.

The device also comprises a pressure-measuring apparatus arranged so that the pump is put out of circuit when the pressure of the accumulator reaches a pressure P, and is returned into circuit when the pressure is equal to $P-\Delta P$. As P is quite large due to the threshold of sensitivity of the apparatus, the time taken for putting the pump out of circuit is fairly long, despite any internal losses in the circuit.

However, this known solution has the disadvantage of necessitating the use of a complex material of oleopneumatic nature.

It is an object of the invention to place the pump out of circuit by means of two closure members connected in series and actuated by the trim-correcting distributors.

In this way, a simple and less costly device can be obtained which permits the pump to be placed out of circuit when the suspension members are not supplied by the distributor and which permits the pump to be returned into circuit for reestablishing the supply.

According to the present invention, the slide valves of the trim-correcting distributors are connected by transmission members to closure members connected in series, selectively controlling the passage of the fluid in a bypass conduit in communication with the pump and supply tank, in dependence upon the position of the slides of the distributors.

Figure 1:
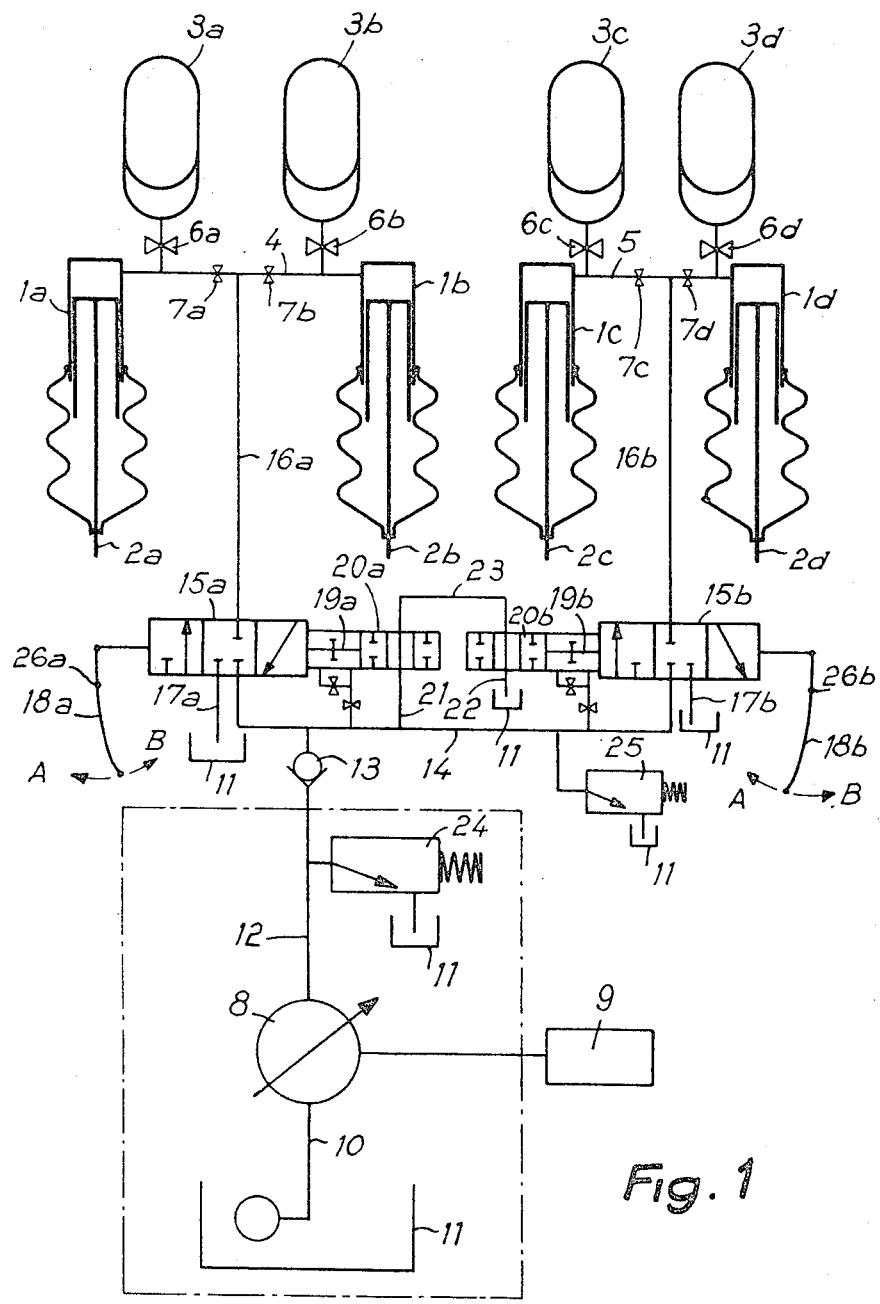
Figure 2:
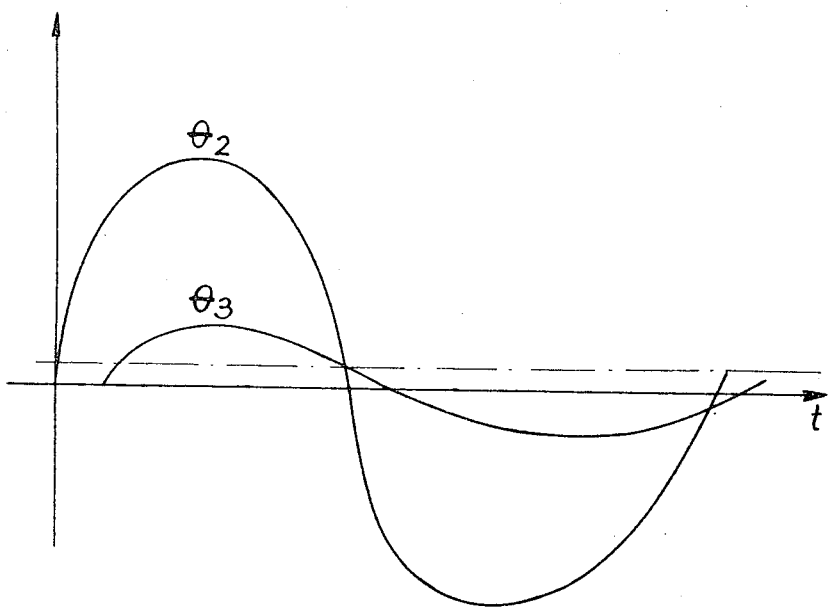
Figure 3:
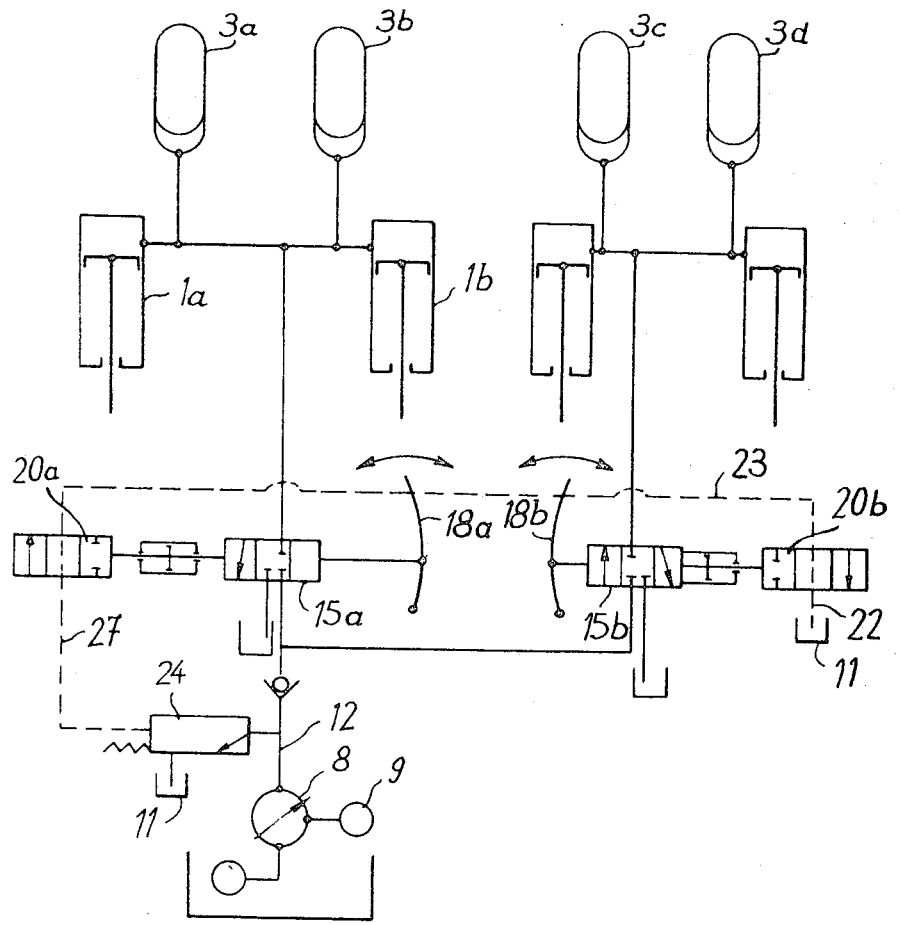
Figure 4:
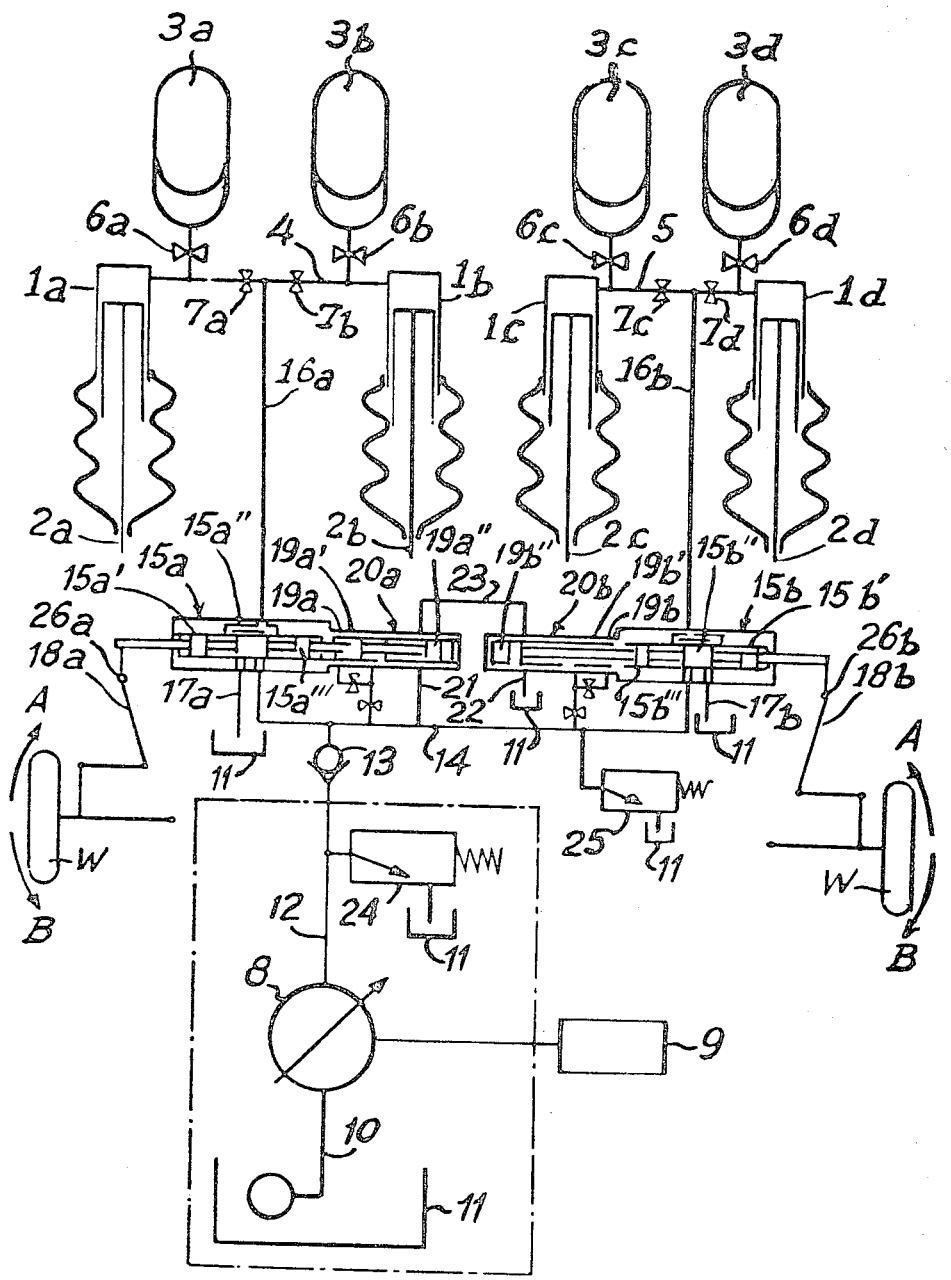

Other objects and advantages of the present invention will become apparent from the following description of certain embodiments given solely by way of nonlimiting examples, said description being made with reference to the accompanying drawings, in which:

FIG. 1 is a schematic diagram of the circuits showing the main components of the hydropneumatic suspension, FIG. 2 is a diagram showing the response of a position-trim-corrector to low frequencies and high amplitudes, FIG. 3 is a modified schematic diagram of the circuits of FIG. 1 showing the main components of the hydropneumatic suspension, and FIG. 4 is a view partly in cross section showing the slide valves, wheels and wheel levers.

Referring now to the drawings, the hydropneumatic suspension shown in FIG. 1 (for which the symbols adopted by the Joint Industry Conference are used) is constituted by jacks or hydraulic cylinders 1a, 1b, 1c, 1d, whose operating rods 2a, 2b, 2c, 2d are respectively secured to wheel supporting arms (shown in FIG. 4 of the drawings). The jacks 1a, 1b are connected together to hydropneumatic accumulators 3a, 3b of any known type, via a conduit 4, and the jacks 1c, 1d are connected in the same manner via a conduit 5 to hydropneumatic accumulators 3c and 3d. Constrictions 6a, 6b, 6c, 6d and 7a, 7b, 7c, 7d are arranged on the conduits 4 and 5 for damping the suspension.

The jacks 1a, 1b, 1c, 1d and the accumulators 3a, 3b, 3c, and 3d constituting the suspension components of the vehicle, are supplied with hydraulic fluid under pressure from a pump 8 which is driven by a motor 9. This pump comprises a suction conduit 10 which terminates in a hydraulic fluid supply tank 11 and a delivery conduit 12, which leads through a nonreturn valve 13, to a conduit 14 connected to trim-correcting slide-valve distributors 15a and 15b.

These distributors 15a, 15b have three channels at which there terminates the supply conduit 14, operational conduits 16a, 16b connected respectively to the conduits 4 and 5 supplying the jacks, and escape conduits 17a, 17b leading towards the tank 11, and include slides which are connected to levers 18a, 18b fixed to the wheel supporting arms (shown in FIG. 4). The slides of the distributors 16a, 16b are respectively connected by transmission members 19a, 19b to the slides of valves 20a, 20b connected in series.

These slide valves 20a, 20b, at which there terminates a conduit 21 in communication with the supply conduit 14 and an escape conduit 22 leading towards the tank 11, are connected in series by a conduit 23.

As shown in FIG. 4, the slide valve distributors 15a and 15b are of a well known type being respectively formed with piston elements 15a', 15a'', 15a''' and 15b', 15b'', 15b'''. These piston elements are operable by the pivoting of arms 18a or 18b around the points 26a or 26b upon the movement of the wheels (W) in the direction of the arrows A or B. As shown, the valves are in the neutral position with the pistons 15a'' and 15b'' blocking the flow of fluid from line 14 to the accumulators, therefore allowing all of the fluid flowing from pump 8 to return to the supply tank 11 via the open conduits 21, 22, 23 since the piston elements of valves 19a'' and 19b'' are in the open or unblocking position.

An expansion valve 24 is connected to the pipe system 12 and an expansion valve 25 to the pipe system 14, each valve being in communication with tank 11.

The operation of the suspension device according to the invention is as follows:

The trim-correcting device as more clearly shown in FIG. 4 is in the state where no variation in the load is applied to the vehicle and where the communication between the conduits 14, 16a, and 17a on the one hand, and the conduits 14, 16b, 17b on the other hand, is interrupted by the piston elements 15a", and 15b", the pump 8 therefore delivers no hydraulic fluid to the jacks 1a, 1b, 1c, 1d nor to the accumulators 3a, 3b, 3c, 3d. The slides of the valves 20a, 20b, through the action of the connections 19a, 19b, are in the position shown in FIG. 4 where communication is established between the conduits 21, 22 and 23 because the piston elements 19a" and 19b" are in the unblocking position, thereby allowing the pump to be out of circuit and discharge directly into the tank 11.

When a load is applied to the vehicle, either or both of the levers 18a, 18b, may be pivoted about the axes 26a, 26b in the direction of the arrows A, to act upon the slides of the distributors 15a, 15b to move the pistons of the slides whereby the discharge passages to the tank 11 may be closed by the pistons 19a" and/or 19b", thereby allowing the pump 8 to communicate with either the conduits 14, 16a or between conduits 14 and 16b, in order to supply the jacks 1a, 1b, and 1c, 1d and the accumulators 3a, 3b, and 3c, 3d with hydraulic fluid.

As stated above, the displacement of the slides of the distributors 15a, 15b, the slides of the valves 20a, 20b are actuated by means of the transmission members 19a, 19b and the communication is interrupted between the conduit 21 and the conduit 22 terminating at the tank 11.

The valves 20a, 20b being connected in series, the displacement of a single piston 19a" or 19b" in cooperation with one of the slides of the distributors, interrupts the communication with the tank 11 by blocking the conduits 22, 21 or 23 and returns the pump into circuit.

In the same way, if the load applied to the vehicle is reduced the levers 18a, 18b pivot about their axes 26a, 26b, in the direction of the arrows B and act upon the slides of said distributors 15a, 15b to move the pistons 15a" and 15b" to the position where they allow communication to be established either between conduits 16a and 17a or between conduits 16b and 17b so that the hydraulic fluid returns to the tank 11.

As stated previously by displacing the slides of the distributors 15a, 15b, the slides of the valves 20a, 20b are actuated by means of the transmission members 19a, 19b, and the passages 21, 23 and 22 are again opened to allow the pump 8 to discharge directly into tank 11.

Now although the arrangement is shown as applied to a trim-corrector with a slide valve, it will be apparent that it can be applied to a trim-corrector having ball valves.

Trim-correctors with non balanced ball valves have a threshold sensitivity produced by the action of hydraulic pressure on the ball valves.

In order to avoid the noise made by the ball valves when they drop onto their seats, the oscillations produced by the axles and the body of the vehicle are filtered by a spring leaf cooperating with a dash-pot.

One advantage of the arrangement is that the cost of a dash-pot having a diaphram without valve is much smaller than that of a dash-pot with cylinder, piston and valves.

In order to obtain a sufficiently accurate trim-correction (to 1 centimeter), a leaf spring is necessary which, for a deflection of one centimeter produces a torque equal to the resistant torque of the ball valves supported on their seat by pressure. This thus brings about a minimum stiffness of the leaf spring.

On the other hand, the maximum pressure of the dash-pot without the valve cannot exceed about 0.8 kg./cm.³ in order that no cavitation is caused during the suction stroke. As the overall dimensions of the dash-pot must be minimum and its pressure relatively low, the product of the useful section of the diaphragm by the pressure gives a limited damping force. This damping force cooperating with a leaf spring of pre-determined stiffness, filters almost all the axle movements (high frequency), but allows one part of the high amplitude movements to pass at low frequency from the body of the car.

The embodiment of FIG. 3 relates to the application of the above mentioned filter in an improved hydropneumatic suspension device as shown in the arrangement of FIG. 1 and comprises a ball valve trim-corrector with one ball valve for placing the pump out of circuit.

FIG. 2 shows a diagram showing the response of the trim-corrector to low frequencies and high amplitudes on which the angles in degrees are plotted on the Y-axis and the time $t$ on the X-axis.

The movement of the chassis is represented by the curve $\theta$ whilst the response of the filter is shown by the curve $\theta 3$ in the case of a position corrector with non balanced ball valves, the dashed and dotted line indicating the control of pressurization of the pump.

It will be seen that $\theta 3$ has an amplitude greater than that of the pressurizing control of the pump and the result is that frequent pressure pulses are caused in the pump, therefore necessitating the use of a heavier and consequently more costly pump.

In order to remedy this disadvantage, the placing of the pump out of circuit by means of two closure members as in the arrangement of FIG. 1 is controlled by a circuit for driving a regulator instead of the direct passage from the pressure circuit in the closure members controlled by the trim-correctors.

The regulator, which has a slow response, eliminates almost all the pressure pulses caused by the ball valve of the trim-corrector.

In this way, the pump can be produced in the most economic manner and this solution also has the advantage of eliminating the pulses which could produce noise.

FIG. 3 shows a diagram of a hydraulic suspension with ball valve trim-correctors which is similar to the arrangement of FIG. 1 and employs the same suspension components.

The ball valve trim-correcting distributors 15a, 15b are connected respectively to closure members 20a, 20b.

The closure member 20a is connected to the drive conduit 27 of the slow response pressure regulator 24.

The closure members 20a, 20b are connected in series by a conduit 23 and the closure member 20b is connected by a conduit 22 to the suction tank 11 of the pump 8.

The pressure in the conduit 12 increases only progressively as a function of time whilst in the arrangement of FIG. 1, the pressure of the pump is directly applied to the closure members.

This embodiment thus enables almost all the pressure pulses caused by the ball valves of the trim-corrector to be eliminated.

It will be understood that the present invention is not limited to the described embodiment but covers on the contrary all modifications thereof as defined by the appended claims.

I claim:
1. A hydropneumatic suspension having hydropneumatic suspension members particularly for a motor vehicle comprising a pump having an output side, means for placing said output side of said pump selectively in communication with said hydropneumatic suspension members, and into a supply tank by two trim-correcting slide valve distributors controlled by wheel suspension members, transmission members connecting the slides of said distributors to two series connector closure members, selectively controlling the passage of fluid in a bypass conduit in communication with said pump and said supply tank in dependance upon the positions of said slides, of said distributors.

2. A suspension according to claim 1, wherein said closure members are constituted by the slide valves, each of which is displaceable between a central opening position and two end closing positions.

3. A hydropneumatic suspension according to claim 1, wherein said trim-correcting distributors are connected by series-connected closure members, controlling the passage of the fluid from a slow response pressure regulator.

4. A hydropneumatic suspension according to claim 3, wherein said slow-response pressure regulator cooperates with a filter of a ball valve trim-corrector.

References Cited

UNITED STATES PATENTS

| 1,980,832 | 11/1934 | Saforcada | 267—65 |
| 2,049,209 | 7/1936 | Level | 267—65 X |
| 3,353,815 | 11/1967 | Henry-Biabaud | 267—64 |

DUANE A. REGER, *Primary Examiner.*

U.S. Cl. X.R.

267—1